United States Patent [19]

Swanson

[11] Patent Number: 4,676,703

[45] Date of Patent: Jun. 30, 1987

[54] REVERSIBLE DRILL AND DRIVE TOOL HOLDER

[76] Inventor: Carl A. Swanson, 1351-B Chesapeake Ave., Naples, Fla. 33942

[21] Appl. No.: 856,657

[22] Filed: Apr. 28, 1986

[51] Int. Cl.[4] .............................................. B23B 31/04

[52] U.S. Cl. .................................... 408/239 R; 7/168; 81/440; 279/14

[58] Field of Search ......... 279/14; 408/239 R, 239 A; 7/138, 142, 158, 167, 168; 81/177.4, 177.7, 177.8, 177.9, 437, 440

[56] References Cited

U.S. PATENT DOCUMENTS

| | | | |
|---|---|---|---|
| 327,969 | 10/1885 | Stowe | 279/14 |
| 336,732 | 2/1886 | Smith | 145/116 R |
| 750,182 | 1/1904 | Furbish | 81/440 X |
| 1,607,310 | 11/1926 | Ross | 7/158 |
| 1,697,414 | 1/1929 | Cordray | 279/14 |
| 1,747,527 | 2/1930 | Peterson | 81/177.8 |
| 1,840,685 | 1/1932 | Witherup | 81/177.7 |
| 2,494,089 | 1/1950 | Guignabert | 81/437 |
| 2,629,415 | 2/1953 | Baker | 81/440 X |
| 2,632,489 | 3/1953 | Johnson | 7/165 X |
| 2,656,865 | 10/1953 | Bright | 81/440 X |
| 3,013,594 | 12/1961 | Nehls | 81/440 |
| 3,023,015 | 2/1962 | Pankow | 7/165 X |
| 3,892,149 | 7/1975 | Rydberg | 81/440 |
| 3,965,510 | 6/1976 | Ernst | 81/469 X |
| 4,092,753 | 6/1978 | Fuhrmann | 7/158 |
| 4,512,693 | 4/1985 | Swanson | 279/14 |
| 4,605,348 | 8/1986 | DeCaro | 408/239 A |

FOREIGN PATENT DOCUMENTS 485883 10/1929 Fed. Rep. of Germany ..... 81/177.8

*Primary Examiner*—Gil Weidenfeld
*Assistant Examiner*—Daniel W. Howell
*Attorney, Agent, or Firm*—Merrill N. Johnson

[57] ABSTRACT

A reversible drill and drive tool for performing a series of similar drill and drive operations. The tool consists of an elongated cylindrical housing having at its rear end a shaft of reduced diameter for insertion into the chuck of a power drill and a front and bifurcated to form two arms with parallel flat interior surfaces and a generally cylindrical tool-holding member having at each end an axially recessed cylindrical socket of reduced diameter adapted to receive a drilling tool at one end and a driving tool at its other end. Each arm of the housing contains an identical elongated slot running parallel to the axis of the housing, and the tool-holding member being slidably and pivotably pinned into the housing by a pin whose outer ends lie within the elongated slots in the arms of the housing. The tool-holding member also has a pair of identical and parallel flat sides which lie parallel to the flat interior surfaces of the arms of the housing and the housing has a third elongated slot which lies at 90° to the first two slots and is positioned to provide clearance for the drilling tool projecting from one end of the tool-holding member as the tool-holding member is pivotably rotated about its pin, and the housing also has a plurality of recesses designed to accommodate portions of the tool-holding member and its tools when the tool holder is in its operating position.

3 Claims, 3 Drawing Figures

REVERSIBLE DRILL AND DRIVE TOOL HOLDER

BACKGROUND AND SUMMARY OF THE INVENTION

In 1982 I invented a reversible drill and drive tool holder which is shown and described in my U.S. Pat. No. 4,512,693 filed Dec. 27, 1982, and issued Apr. 23, 1985. When chucked into the chuck of a high speed electric drill, my reversible tool holder eliminates the inconvenience of multiple chucking and unchucking operations and provides a reversible drill and drive tool holder that is simple to use.

However, the tool holder shown and described in U.S. Pat. No. 4,512,693 comprised three interconnected parts, each requiring considerable machining and thus rather expensive to manufacture.

I have now invented an improved reversible tool holder which includes only two major components and is therefore less expensive to manufacture than my original tool holder. In addition, my improved tool holder can be reversed in less time than my prior tool holder and provides positive locking of the tool into operating position to insure safe operation of either the drill or driving tool.

Basically, my improved tool holder consists of an elongated cylindrical housing and a reversible tool-holding member slidably and pivotably pinned into the cylindrical housing. The cylindrical housing has at its rear end an axial shaft for insertion into the chuck of an electric drill. The front end portion of the housing is bifurcated to form a yoke of the front half of the housing and a pair of elongated slots extend axially along the arms of the yoke.

The tool-holding member has a socket at each end designed to hold a drill bit at one end and a driving tool at the other end. The member is held within the arms of the housing's yoke by a pin. The pin fits into the two elongated slots in the arms of the yoke. The tool-holding member has a pair of flat sides which fit within the inner flat surfaces of the arms of the yoke.

The tool-holding member has identical ends consisting of a cylindrical socket whose outer diameter is the same as the distance between the flat sides of the tool-holding member. Each cylindrical socket is axially bored to receive at one end a drill bit and at the other end a nut driver. A radially-threaded hole in each end of the tool-holding member receives a set screw which secures the drill bit and the nut driver into the sockets at each end of the tool-holding member.

In order to secure the tool-holding member into axial alignment with the axis of rotation of the electric drill, the rear half of the cylindrical housing is machined to provide an axial cylindrical recess into which the cylindrical socket on each end of the tool-holding member can slide as the tool-holding member is slid rearwardly after having been rotated 180° on its pin with the pin slid as far forwardly as it can go within the elongated slots in the arms of the housing's yoke.

The rear portion of the housing is also machined to provide an axial recess which will accommodate the tip end of the drill bit when the tool-holding member is slid backwards along the elongated slot in the yoke's arms. And the rear portion also includes an elongated slot located 90° from the elongated slots in the yoke's arms, which rearwardly located slot provides clearance for the 360° rotation of the drill bit when the tool-holding member is in its most forward position.

In order to secure the tool-holding member in its most rearward position while the drill bit or the nut driver is actually being used, two identical pairs of small indentations are drilled into the two flat-faced sides of the tool-holding member equidistant from and on opposite sides of the pin running through the tool-holding member. Each pair of indentations is designed to be engaged by the ends of two pointed set screws screwed into two radially-threaded holes in the housing when the tool-holding member is in its most rearward position.

DETAILED DESCRIPTION OF THE PREFERRED EMBODIMENT

Figure 1:
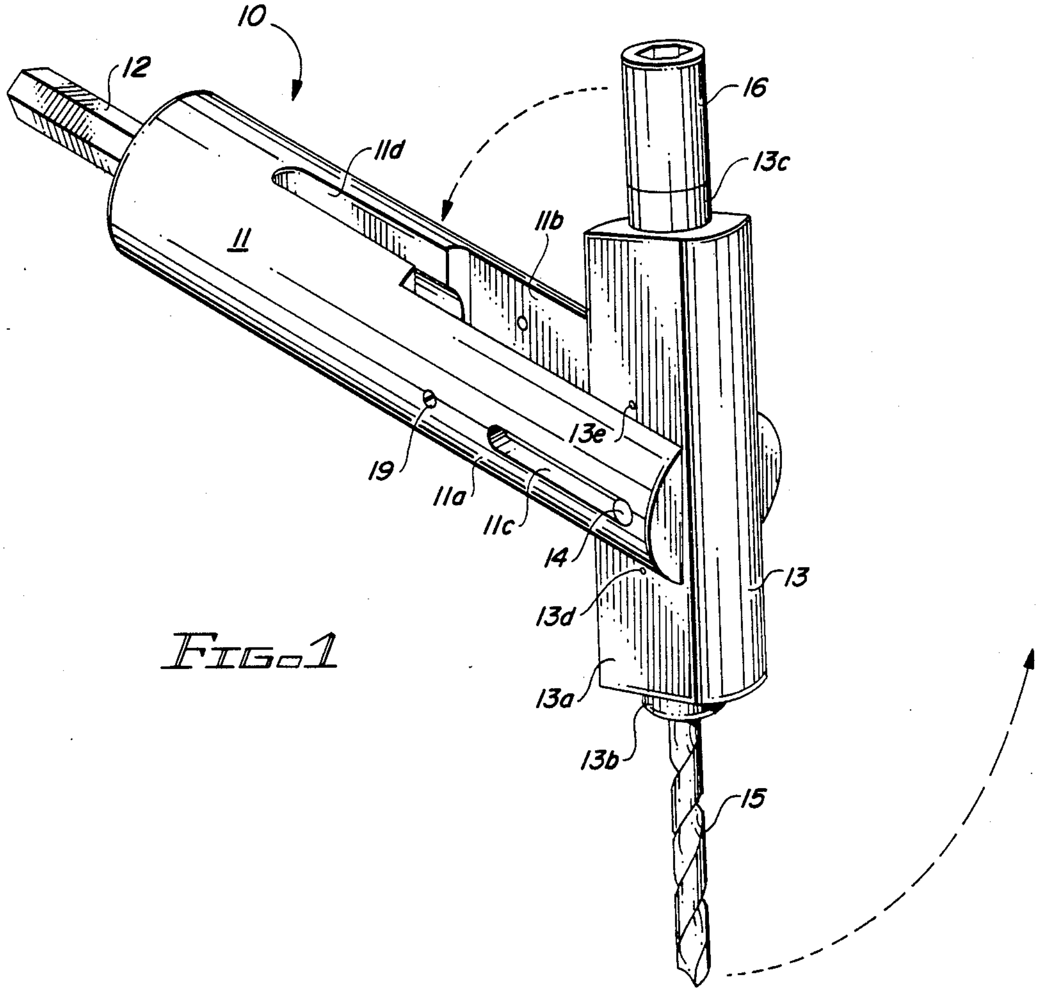
FIG. 1 is a perspective view of a preferred embodiment of my improved tool holder showing the drill and drive tool-holding member in its most forward position within the housing being rotated to bring the drill into axial alignment with the shaft which is inserted into the chuck of an electric or pneumatic drill.

Referring to the drawings, FIG. 1 shows my improved reversible drill and drive tool holder 10 and its two major components; namely, elongated cylindrical housing 11 having at its rear end axial shaft 12 of reduced diameter suitable for insertion into the chuck of a high speed pneumatic or electric drill, and a tool-holding member 13 which is slidably and pivotably pinned into housing 11 by cylindrical pin 14.

Housing 11 is preferably made of tool steel and its front end is bifurcated into a yoke having two arms **11*a* and 11*b*. Identical elongated slots 11*c* extend along arms 11*a* and 11*b*. These slots house the opposite ends of pin 14 which connects housing 11 and tool-holding member 13 and permits member 13** to rotate 360 degrees and to slide back and forth along the slots.

The main body of member 13 is an elongated cylinder with two parallel flat sides 13a which lie parallel to the inside flat surfaces of arms **11*a* and 11*b* of housing 11. Two identical cylindrical sockets 13*b* and 13*c* project axially from the opposite ends of member 13. Sockets 13*b* and 13*c* are axially recessed to receive at one end a drill bit such as 3/16ths inch bit 15 and at its other end a nut drive 16 as shown as examples in FIGS. 1, 2 and 3**.

Figure 2:
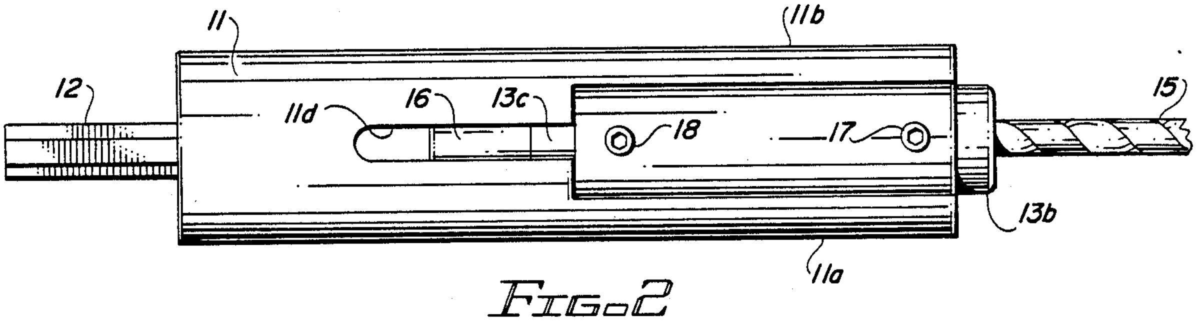
FIG. 2 is a plan view of the tool holder shown in FIG. 1 with the tool-holding member in its most rearward position and a 3/16ths inch drill bit in operating position.

Drill bit 15 is secured into socket **13*b* by set screw 17 screwed into a radially-threaded hole in member 13 and nut driver 16 is secured into socket 13*c* by set screw 18 as shown in FIG. 2**.

In order to provide clearance for drill bit 15 when member 13 is rotated 180 degrees about pin 14, the rear portion of housing 11 contains a slot lid which lies at 90 degrees to elongated slots **11*c* and thus provides clearance for bit 15 when member 13 and pin 14 are in their most forward position within slots 11*c*. Also, to permit member 13 to be slid backward along slots 11*c* and thus lock member 13 and its drill and drive tools into axial alignment with the axis of rotation of the power drill, member 11 includes a pair of arcuate recesses 11***e* in its inner walls to accommodate either socket 13b or alternatively socket 13*c* and nut driver 16 as shown in the cut-away portion of FIG. 3

Figure 3:
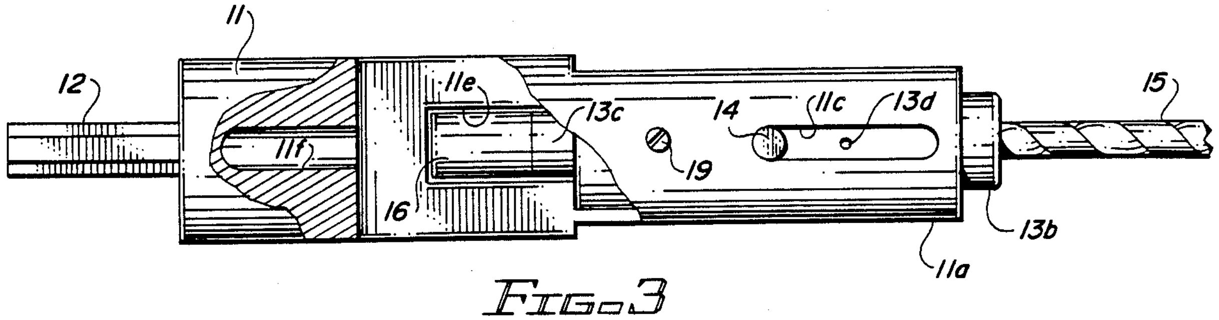
FIG. 3 is a side view of the tool holder shown in FIG. 2 partially broken away to show the cylindrical recesses in the housing which accommodate the ends of the tool-holding socket and the drill bit.

When tool holder 10 is being used to drive and socket 13*b* lies within cylindrical recesses 11*e*, drill bit 15 will lie within axial hole 11*f* shown in the cut-away portion of FIG. 3.

To further insure that the drill or driving tool is properly aligned with the axis of rotation of the power drill during drilling or driving operation, my improved tool holder includes two pairs of identical semi-spherical recesses 13*d* and 13*e* in the flat faces 13*a* of the tool-holding member as best shown in FIG. 1 and a pair of pointed set screws 19 screwed into radially-threaded holes in arms 11*a* and 11*b*. The points of set screws 19 extend slightly beyond the flat inner walls of arms 11*a* and 11*b* so as to engage recesses 13*e* or 13*d* depending upon whether bit 15 or nut driver 16 is in operating position at the front end of tool holder 10.

Since my improved tool holder 10 includes only two major components rather than three as required by my original reversible tool holder shown in U.S. Pat. No. 4,512,693 and needs no spring to hold the tool in axial alignment during operation, my improved tool holder is much less costly in manufacture and can be changed from a drilling tool to a driving tool in less time and with less effort. The change from drill to drive operation or the reverse can be made by a onehand manipulation in two seconds or less.

The preferred embodiment of my improved drill and drive tool holder as herein shown and described may suggest certain changes or modifications to those skilled in the art. However, it is to be understood that the description of the preferred embodiment is not to be considered as any limitation of my invention, which is limited only by the scope and spirit of the following claims.

I claim:

1. A reversible drill and drive tool comprising an elongated cylindrical housing having at its rear end a shaft of reduced diameter for insertion into the chuck of a power drill and a front end bifurcated to form a yoke having two arms with parallel flat interior surfaces, each arm of the housing containing an identical elongated slot running through the arm and lying parallel to the axis of the housing, and a generally cylindrical tool-holding member having at each end an identical axially recessed cylindrical socket of reduced diameter adapted to receive a drilling tool at one end and a driving tool at its other end, the tool-holding member being slidably and pivotably pinned into the housing by a pin whose outer ends lie within the elongated slots in the arms of the housing, the tool-holding member also having a pair of identical and parallel flat sides which lie parallel to the flat interior surfaces of the arms of the housing, the housing also having a third elongated slot which lies at 90 degrees to the first two slots and is positioned to provide clearance for the drilling tool projecting from one end of the tool-holding member as the tool-holding member is pivotably rotated about its pin, and the housing also having an axial recess to accommodate the drill and two arcuate recesses to accomodate a cylindrical socket of the tool-holding member when the driving tool is in operating position.

2. A reversible drill and drive tool as set forth in claim 1 in which each of the flat sides of the tool-holding member includes two identical hemispherical recesses equidistant from the axis of the cylindrical pin, each of the arms of the housing contains a radially drilled and threaded hole whose axis intersects one of the recesses in the tool-holding member when the pin is located at the rearward end of the elongated slot and the tool-holding member is axially aligned with the axis of the housing, and a pointed set screw is screwed into each radially threaded hole with its pointed end slightly projecting from the flat interior surface of the housing so as to seat its pointed end into one of the recesses in the tool-holding member.

3. A reversible drill and drive tool designed to be chucked into the chuck of a high-speed pneumatic or electric power drill comprising an elongated cylindrical housing having at its rear end a shaft of reduced diameter for insertion into the chuck of a power drill and a front end bifurcated to form a yoke having two similar arms with parallel flat interior surfaces, the arms of the housing containing aligned identical elongated slots running thorough said arms and lying parallel to the axis of the housing, and a generally cylindrical tool-holding member having at each of its ends an axially recessed cylindrical socket of reduced diameter adapted to receive a drilling tool at one end and a driving tool at its other end, the tool-holding member being slidably and pivotably pinned into the housing by a cylindrical pin whose outer ends lie within the two elongated slots in the arms of the housing, the tool-holding member also having a pair of identical and parallel flat sides which lie closely adjacent and parallel to the flat interior surfaces of the arms of the housing, the housing also having a third elongated slot which lies at 90 degrees to the first two slots and is positioned to provide clearance for the drilling tool projecting from one end of the tool-holding member as the tool-holding member is pivotably rotated about its pin when the pin is located at the forward end of the elongated slots of the housing, and the housing also having a plurality of recesses designed to accommodate portions of the tool-holding member and its tools when the pin is located at the rearward end of the elongated slots in the housing and one of the tool holders is in its operating position.

* * * * *